United States Patent [19]
Chang

[11] Patent Number: 4,907,410
[45] Date of Patent: Mar. 13, 1990

[54] THERMAL ENERGY FROM ENVIRONMENTAL FLUIDS

[76] Inventor: Yan P. Chang, 181 Sherbrooke Ave., Williamsville, N.Y. 14221

[21] Appl. No.: 266,213

[22] Filed: Oct. 28, 1988

Related U.S. Application Data

[63] Continuation of Ser. No. 133,146, Dec. 14, 1987, abandoned.

[51] Int. Cl.⁴ ............................................. F01K 23/04
[52] U.S. Cl. ................................... 60/641.6; 60/655; 60/645
[58] Field of Search ................ 60/643, 645, 650, 651, 60/670, 671, 682, 641.6, 641.7, 655

[56] References Cited

PUBLICATIONS

"Engineering Thermodynamics", by Jones & Hawkins, John Wiley & Sons: New York, 1960, pp. 210-217.

Primary Examiner—Allen M. Ostrager
Attorney, Agent, or Firm—Kenyon & Kenyon

[57] ABSTRACT

A method of utilizing the thermal energy of environmental fluids to produce mechanical work or electricity by an energy conversion system wherein: the source fluid gives heat to the working fluid of a prime mover through a first heat exchange means and is cooled thereby; the cooled source fluid effluent from the said first heat exchange means is further cooled by passing it through a further cooling system which includes either a turbine or an expansion device or both; the further cooled source fluid is employed to cool the expanded working fluid of the prime mover, and the source fluid effluent from the energy conversion system may be used for other cooling and refrigeration processes, such as desalination of seawater, cooling of superconductors, etc.

13 Claims, 9 Drawing Sheets

THERMAL ENERGY FROM ENVIRONMENTAL FLUIDS

This application is a continuation of application Ser. No. 133,146, filed Dec. 14, 1987, now abandoned.

BACKGROUND OF THE INVENTION

This invention is related to the energy conversion in general and the utilization of thermal energy of the atmosphere, the ocean, a large lake or a large river for power production in particular. Waste water from industry and cities and other fluids of the so-called low quality thermal energy can also be utilized. The fluid or fluids discharged from these power plants are at very low temperature and therefore can be used for desalination of seawater and other cooling or refrigeration processes, such as the cooling of superconductors, air conditioning, etc.

It is known that the higher the source temperature and the lower the sink temperature, the higher will be the efficiency of thermal energy conversion.

The high temperature development has attained the allowable limit of material, whereas the lowest temperature has been limited by the ambient temperature of naturally available water and atmosphere. It has thus been concluded that available energy will become limited, as fossil and nuclear fission fuels become scarce, unless other heat sources can be found. The quantity of solar energy incident upon the earth is almost limitless, but it is diffuse. By using collectors, relfectors and absorbers, the energy thus produced is not only expensive but also unsteady. The atmosphere, the ocean, a large lake and a large river are natural solar-energy absorbers, but the utilization of ocean thermal energy has not developed beyond that of Claude-type power plants (Mechanical Engineering, Vol. 52, 1430) making use of the temperature gradient in a deep ocean with efficiency of only a few percent.

Further increase of efficiency requires a number of new concepts in thermodynamics and therefore, a brief discussion on the second law is in order.

(1) A heat reservoir is a *concept* representing a large body that remains at constant temperature regardless of the amount of heat transferred to or from it. Such a reservoir is a *closed system* as illustrated by FIG. 1 where W designates the work done by an engine and the *temperature difference between the two heat reservoirs plays an important role in engine performance.*

(2) The second law is the law of entropy which cannot decrease spontaneously or continuously in an isolated system.

(3) Kelvin and Planck stated that it is impossible to construct a device which operates in a cycle and produces useful work without other effects by taking heat from a single reservoir. There are many versions of the second law statement, but all are equivalent and based upon a closed system as shown in FIG. 1.

(4) The work produced by a cycle is limited by that of the Carnot cycle, but the work produced by a *noncyclic process* is not.

(5) The atmosphere or the ocean is often used to illustrate the conceptual heat reservoir and, according to the statement (2) above, it has been concluded that an engine cannot be built to produce continuously useful work by utilizing the amtosphere or the ocean as a single heat source. Therefore, thermal energy of environmental fluids in homogeneous condition has been considered as a *dead state*.

It is to be noted that a heat source or a heat sink can be either a closed or an open system while the conceptually defined heat reservoir on which the second law statement (3) is based is a closed system. The atmosphere or the ocean can be utilized as an open heat reservoir. An open heat reservoir is more versatile than a closed reservoir. For instance, an open-cycle engine is a system drawing heat from an open heat reservoir and discharging mass, heat and entropy to the environment of *any temperature*. In this case, the environment is just a *dumping reservoir* but is not the lower temperature reservoir defined conceptually in classical thermodynamics as shown by FIG. 1.

All versions of statement like (3) of the second law are made on the basis of a closed system enveloped by the surroundings which is an isolated system of indefinite extent. Now, if the enclosed system operates on a cycle only and exchanges heat with the surroundings as a single reservoir, then $$dW = dQ$$

where W and Q denote the work done by and heat supplied to the closed system. If $dW > 0$ then $dQ > 0$ and the surroundings is cooled continuously. Hence entropy decreases continuously in the surroundings (an isolated system) and is in violation of statement (2). However, if the enclosed system involves *both cyclic and non-cyclic* operations, then $$dQ = dW - dE \qquad (2.1)$$

where dE represents the change of total energy of the open system. For this case, the possibility that $dW > 0$, $dQ > 0$ and $dS \geq 0$, where S designates the entropy, cannot be ruled out. If the non-cyclic operation can do work, and the cyclic operation is reversible, *then the system can produce more work than the Carnot cycle* operating between the same pair of heat reservoirs.

A substance is thermally at *dead state* only when its temperature is at absolute zero. However, if the heat sink is to be in fluid state, then its *triple point* may be considered as the *dead state*.

SUMMARY OF THE INVENTION

A method is invented to utilize the thermal energy of environmental fluids for producing power and refrigeration with high efficiency. By treating the atmosphere or the ocean as an open heat reservoir, a closed reservoir in heterogeneous-equilibrium of large temperature differential can be dynamically created and therefore useful work can be produced at high efficiency. Three systems are considered: ocean thermal energy conversion (OTEC), atmosphere thermal energy conversion (ATEC) and atmosphere-ocean thermal energy conversion (A-OTEC). Each system may include a prime mover operating in a closed cycle, a first and second heat exchange means and a further cooling system. The working fluid of the prime mover may be pressurized gas or vapor. The source fluid is passed through the first heat exchange means giving heat to the working fluid of the prime mover and being cooled thereby. The cooled source fluid is further cooled as it passes through the further cooling system by expansion either in a turbine or simply an expansion valve or both. This further cooled source fluid is then employed to cool the expanded working fluid of the prime mover through the second heat exchange means.

BRIEF DESCRIPTION OF DRAWINGS

For a full understanding of the present invention, reference should be made to the following detailed description thereby taken in conjunction with the accompanying drawings wherein.

PREFERRED EMBODIMENTS

1. Basic Method

Figure 2:
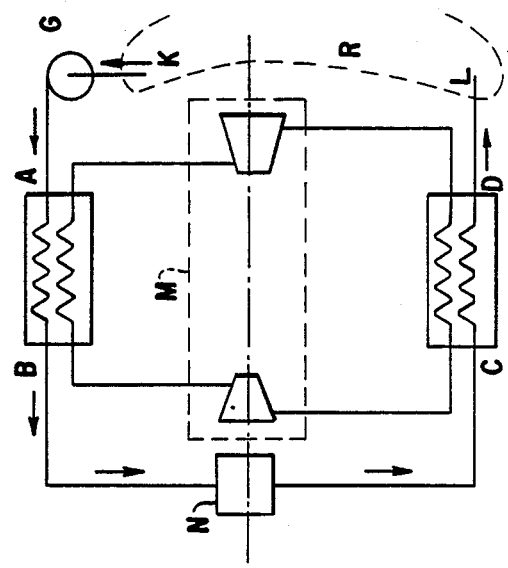
FIG. 2 shows the basic method of the present invention.

FIG. 2 shows schematically the steady-state flow diagram of an energy conversion system utilizing the thermal energy of an environmental fluid for the production of power and refrigeration. For simplicity, the environmental fluid may be assumed to be a single component and will be referred to as the source fluid. If the source fluid is gas, the system will be called ATEC system with ATEC designating atmosphere thermal energy conversion. If the environmental fluid is liquid, the system will be referred to as OTEC system with OTEC denoting ocean thermal energy conversion. If both gas and liquid are used simultaneously as the heat sources, the system will be called A-OTEC system where A-O stands for atmosphere-ocean.

In FIG. 2, R represents a heat reservoir; G a supercharger; M a prime mover operating on a closed cycle; N a further cooling system; and AB and CD are heat exchangers which will be referred to as the first and second heat exchange means, respectively. The further cooling system may include a turbine with the source fluid as its working fluid, or a simple expansion device, or both. Let p and P denote the static and total pressures of the source fluid; and subscripts a, A, B, C, and D identify states of the source fluid at the ambient condition, and locations A, B, C and D, respectively. The following conditions are assumed:

$$p_a < P_A \leqq P_C > p_B, \quad p_C < p_B, \quad P_C > P_D \geqq P_a \tag{1}$$

which shows that the source fluid will flow through the system. How to achieve these conditions will be discussed later.

As the source fluid flows through the first heat exchange means, it gives heat to the working fluid of the prime mover M and is cooled thereby. The cooled source fluid is further cooled by expansion as it passes through the further cooling system N. This further cooled source fluid is then employed to cool the expanded working fluid through the second heat exchange means from which it discharges to the reservoir R at location L. The location L must be at a great distance from the location K where the source fluid flows out from the reservoir R, so that the thermodynamic state of the source fluid at location K will not be disturbed.

Figure 1:
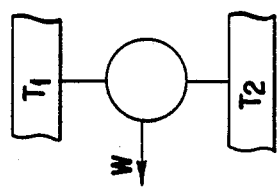
FIG. 1 shows conceptual heat reservoirs.

Now if the source fluid inside R as enveloped by the dash-lined contour is considered as a reservoir, then the reservoir R is an open system. Note that either the upper portion or the lower portion of the reservoir R is of indefinite extent so that the thermodynamic state of reservoir R will not change significantly. The upper portion is the heat source while the lower portion serves merely as a dumping reservoir, but is not the lower temperature reservoir in FIG. 1.

To start the operation of the energy system in FIG. 2 and also to *initiate the release of thermal energy from the environmental fluid,* a coolant supplied by a starting system (not shown in the figure) is conducted into the second heat exchange means to cool the working fluid of the prime mover for a short period of time. The coolant may be a liquified gas which can be produced when the energy system operates during a low load period (usually at night for a stationary power plant). The starting system may be a conventional gas liquefaction system.

It is important to note that the prime mover M is a closed system and the further cooling system N is an open system, both operating between two heat reservoirs: one is the source fluid which is naturally available and the other is the further cooled source fluid which is initially created by the starting system and subsequently maintained by the energy system. This bears some resemblance to the nuclear reaction: once the reaction starts, chain-reaction follows, except that for the present system the "chain-reaction" is achieved by macroscopical processes.

By neglecting changes of potential and kinetic energies, the first law gives the work produced by the prime mover (a cyclic system) per unit mass flow of the source fluid:

$$w_1 = q_{AB} - q_{DC} \tag{2}$$

where $q_{AB}$ and $q_{DC}$ denote the heat supplied to and rejected by the prime mover per unit mass flow of the source fluid. For an ATEC system, the further cooling system may include a turbine. The work done by this noncyclic open system and the work required by the supercharger G are, respectively:

$$w_2 = (h_B - h_C) \tag{3}$$

$$w_3 = (h_a - h_A) \tag{4}$$

where h designates the specific enthalpy of source fluid. Summing up Equations (2–4) gives the work done by the ATEC system in FIG. 2:

$$w = q_{AB} - q_{DC} + (h_B - h_C) - (h_A - h_a) \quad (5)$$

which shows clearly that the work done by the ATEC system can be more than the work done by the cyclic system alone, if $(h_B - h_C) > (h_A - h_a)$ which will be the case of interest in this invention.

Since all actual processes, such as heat transfer and fluid flow in the system are in general irreversible, $$S_D - S_a \geq 0$$

The mixing of the source fluid at state D with the environmental fluid in the surroundings produces another increase of entropy.

The efficiency of the prime mover is $$\eta_1 = 1 - \frac{q_{DC}}{q_{AB}} \quad (6)$$

Efficiencies of the turbine of the further cooling system and the supercharger are respectively:

$$\eta_2 = \frac{(h_B - h_C)}{(h_B - h_C)_S} \quad (7)$$

$$\eta_3 = \frac{(h_A - h_a)_S}{(h_A - h_a)} \quad (8)$$

where the subscript S of parentheses designates the isentropic process. The efficiency of the ATEC system may be defined by $$\eta = \frac{w}{(q_{AB}) - (q_{DC}) + (h_B - h_C)_S} \leq 1 \quad (9)$$

or for the purpose to compare efficiencies of the ATEC system and existing power plants, it may be defined on the basis of $q_{AB}$, $$\eta' = \frac{w}{(q_{AB})} = 1 - \frac{(q_{DC})}{(q_{AB})} + \quad (10)$$

$$\frac{(h_B - h_C) - (h_A - h_a)}{(q_{AB})}.$$

For an OTEC system, the further cooling system may include a simple expansion device instead of a turbine and so $(h_B - h_C)$ drops from the above equations. For an A-OTEC system, it is more advantageous to use water as much as possible to be the heat source while the atmosphere to be the heat sink. This will be discussed later.

2. OTEC Systems

Figure 3:
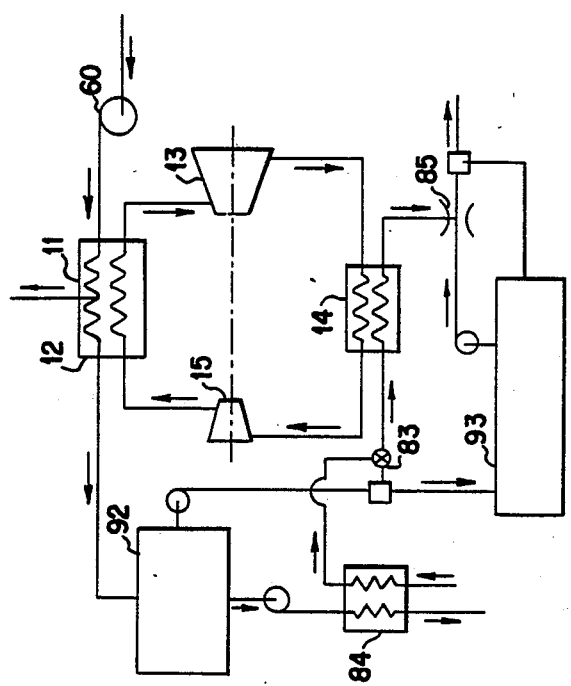
FIG. 3 shows schematically a flow diagram of an OTEC system.

FIG. 3 shows schematically a flow diagram of an OTEC system, which extracts thermal energy solely from seawater, and is employed for producing power and fresh water. The prime mover includes a vapor turbine 13 and a condensate pump 15 operating on the Rankine cycle 12341. Seawater is pumped by pump 60 to flow through a heat exchanger 11 at a flow rate large enough to have its temperature little changed in the heat exchanger 11. A part of the seawater effluent from the heat exchanger 11 is discharged to the surroundings, while the remaining part flows into the heat exchanger 12 wherein it gives heat to the working fluid at essentially constant pressure and is cooled thereby to the freezing point. The cooled seawater is conducted into a water plant 92 wherein it is subcooled by expansion to about one or two degrees centigrade below the triple point, and ice crystals separated from the brine to become fresh water.

Figure 4:
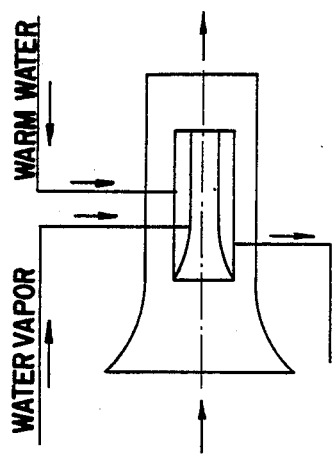
FIG. 4 is an enlarged view of the jet pump in FIG. 3.
Figure 5:
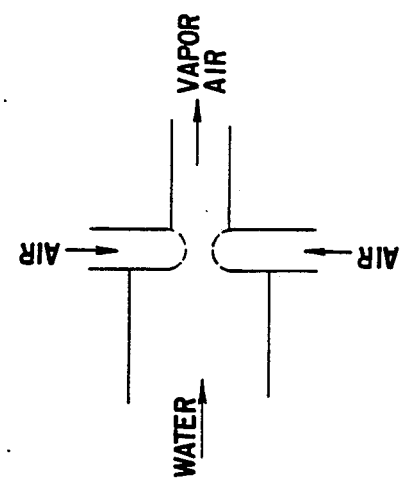
FIG. 5 illustrates de-icing of the throttle valve.

The produced fresh water is diverted into two streams: the main stream goes to a reservoir 93 while a smaller stream passes through a throttle valve 83 and evaporates in the heat exchanger 14 to cool the working fluid. The water vapor is inducted by the main stream through a jet pump 85 which is schematically shown in FIG. 4. To avoid ice formation in the jet pump, the inner nozzle may be heated by warm fresh water at room temperature as shown in FIG. 3A. Also to prevent ice formation over the wetted surface of the throttle valve 83, its surface may be protected by many minute air jets precooled by the brine through a heat exchanger 84 and is induced by the throttle valve 83, as shown schematically in FIG. 5.

In thermodynamics aspects, the system shown in FIG. 3 is quite similar to the 100 kW OC-OTEC Pilot Plant installed in the Republic of Nauru. (Report of Tokyo Electric Co., Tokyo, Japan, 1982) which utilizes deep seawater as the heat sink. If a temperature difference of 5.2° C. is allowed for heat transfer, the cycle of the prime mover is at a temperature range of about 30° C., while that of the 100 kW Nauru power plant operates in temperature range of 13° C. Therefore, the system in FIG. 3 can produce useful work more than that of the Nauru plant.

Figure 6:
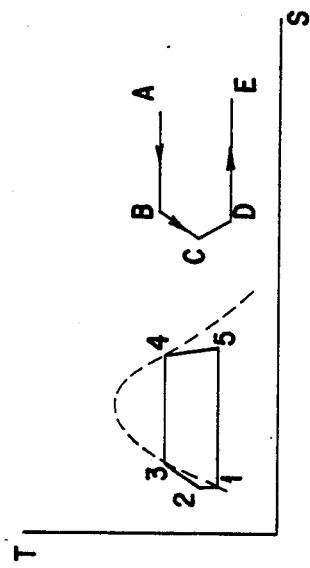
FIG. 6 depicts the Temperature-Entropy diagrams of the Rankine cycle and the flow-path of the source fluid.

As an example, consider the OTEC system in FIG. 3 with Freon 12 as the working fluid and a temperature difference of 5.2° C. allowed for heat transfer between any two fluids, as was used in the design of the 100 kW-OTEC Nauru pilot plant. The temperature-entropy diagrams of the Freon cycle 12345 and the flow path of source fluid ABCDE are shown schematically in FIG. 6. The following notations and units will be used in this and ensuing sections:

T = temperature, °C., °K.
v = specific volume, m³/kg
s = entropy, kJ/kg-K
p = pressure, kPa
h = specific enthalpy, kJ/kg Subscripts 1,2,3,4,5 and A,B,C,D,E of the above properties are pertaining to Freon and seawater, respectively. With the prescribed data:

$$T_A = T_B = 30, \quad T_D = T_E = 0$$

a straightforward calculation gives
heat supplied = $h_4 - h_2$ = 156.54
heat rejected = $h_5 - h_1$ = 148.75
work produced = 8.79 kJ/kg
efficiency = 5.6%

3. Power Cycles

Figure 7:
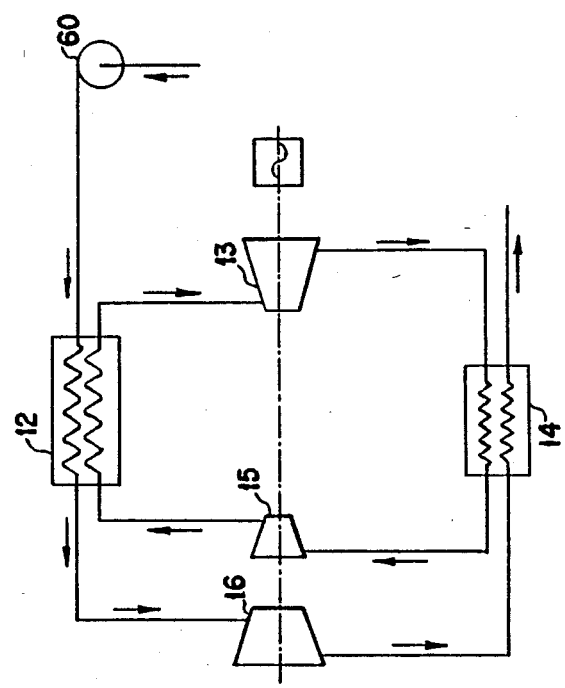
FIG. 7 shows schematically the flow diagrams of an ATEC system.

In order to determine what gas power cycles are suitable for the new energy systems, an ATEC system which operates reversibly on the Carnot cycle may be considered. The flow diagram is shown schematically in FIG. 7. The same numerals in FIGS. 3 and 4 represent the same components, except that 15 in FIG. 7 represents a compressor and 60 a supercharger of air.

Figure 8:
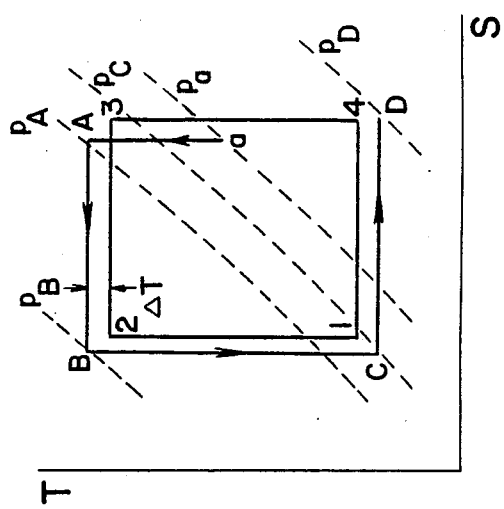
FIG. 8 depicts the Temperature-Entropy diagrams of the Carnot cycle and the flow-path of the source fluid.

The temperature-entropy diagram for the working and source fluids are shown by 12341 and ABCD, respectively, in FIG. 4A. Since the heat transfer processes have been assumed reversible, $\Delta T = 0$, i.e. states 1, 2, 3, and 4 coincide with states C, B, A, and D, respectively. Isobaric lines are also sketched in FIG. 8. It is seen that all the inequalities in (1) are satisfied. From Equation (5), there results $$w_{rev} = q_i\left(1 - \frac{T_e}{T_i}\right) + (h_B - h_C)_S - (h_A - h_a)_S \quad (11)$$

where $q_i=T_i(S_A-S_B)$, $T_i=T_A=T_B$ and $T_e=T_D=T_C$. Since $(h_B-h_C)_S>(h_A-h_a)_S$, the reversible work done by the ATEC system is greater than that by the closed system (the Carnot engine), i.e. $w>w_1$. The lower the temperature $T_e$ and hence also $h_C$, the larger will be the additional work, $w_2$, but is limited by the condition that the pressure at the state C must be at least equal to the ambient pressure.

Now, with the reversible work known, a more meaningful efficiency of an irreversible ATEC system may be defined by $$\eta = \frac{w}{w_{rev}} \leq 1 \quad (12)$$

where w and $w_{rev}$ are given by Equations (5) and (11), respectively.

One important advantage of the Carnot cycle to the ATEC system is the rapid increase of static and total pressures of the source fluid as it gives heat to the working fluid, so that it can be further cooled by passing it through a turbine to do more work. However, $(h_B-h_C)_S$, is limited by the condition that the pressure of state C must be higher than the ambient pressure, which depends on $(S_A-S_B)T_i$. Large $(S_A-S_B)T_i$ means also large $(S_D-S_C)T_e$. For the former, the source fluid flow could be decelerated rapidly to be virtually stagnant unless large velocity is provided at state A. For the latter, i.e. large $(S_D-S_C)T_e$, the flow could be accelerated so fast as to be supersonic. Both possibilities must be avoided in heat exchangers. Therefore, despite the superiority of Carnot cycle, it is difficult to be applied in practice. For this reason, a new cycle is recommended, as shown schematically by 1234561 in FIG. 9 where 1-2 and 4-5 represent adiabatic compression and expansion, 2-3 and 5-6 isobaric heating and cooling, and, 3-4 and 6-1 isothermal heating and cooling.

The isothermal heating and cooling can be achieved by considering the one-dimensional flow in a channel of variable cross-sectional area with heat addition or subtraction. From conservative equations of mass, momentum and energy along with the state equation of an ideal gas, the following results can be obtained (S. I. Pai, Compressible Flow, Van Nostrand, 1959):

$$\frac{dV}{v} = \frac{1}{1-M^2}\left(\frac{dQ}{h} - \frac{dA}{A}\right) \quad (13)$$

$$\frac{dp}{p} = -\frac{kM^2}{1-M^2}\left(\frac{dQ}{h} - \frac{dA}{A}\right) \quad (14)$$

$$\frac{dT}{T} = \frac{1-kM^2}{1-M^2}\left(\frac{dQ}{h} - \frac{dA}{A}\right) + \frac{dA}{A} \quad (15)$$

where V denotes the velocity; p the static pressue; A the cross-sectional area of the channel; h the specific enthalpy; dQ the heat supplied or subtracted; M the local Mach number; and k the specific heat ratio.

For the flow in a heat exchanger, the velocity should not be large everywhere, i.e. and $kM^2<1$. For isothermal flow, $dT=0$ so that Equation (15) gives the relation, $$\frac{dA}{A} = \frac{1-kM^2}{(k-1)M^2}\frac{dQ}{h} \quad (16)$$

Substituting Equation (16) to Equations (13-14) yields $$\frac{dV}{V} = -\frac{1}{1-kM^2}\frac{dA}{A} \text{ or} \quad (17)$$

$$\frac{dV}{V} = \frac{1}{(k-1)M^2}\frac{dQ}{h}$$

$$\frac{dp}{p} = \frac{kM^2}{1-kM^2}\frac{dA}{A} \text{ or} \quad (18)$$

$$\frac{dp}{p} = -\frac{k}{k-1}\frac{dQ}{h}$$

Figure 9:
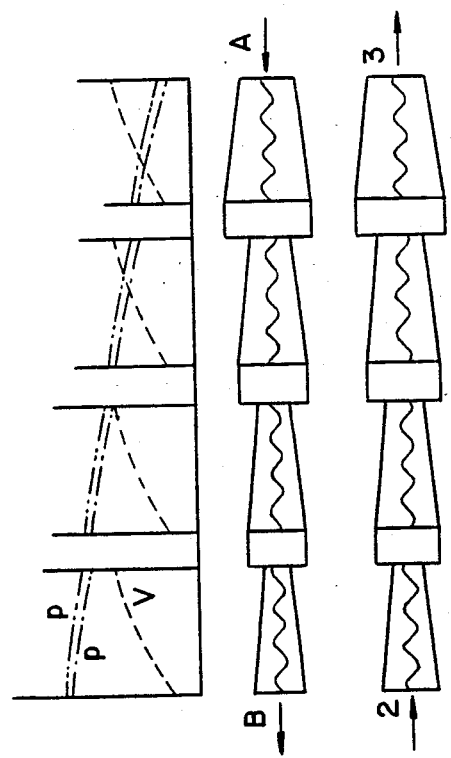
FIG. 9 illustrates schematically the Temperature-Entropy diagrams of a new gas power cycle and the flow path of source fluid without change of phase.
Figure 12:
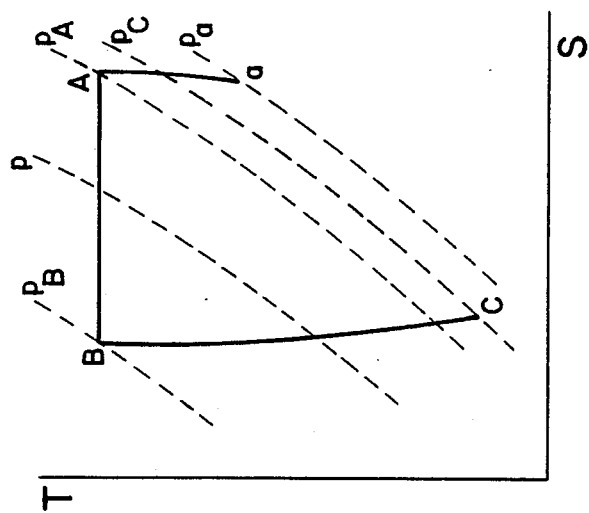
FIG. 12 shows the Temperature-Entropy diagram of a modified Rankine cycle and the flow-path of the source fluid with change of phase.

For the fluid to be cooled, i.e. $dQ<0$, and if $dA>0$, then $$\frac{dQ}{V} < 0 \text{ and } \frac{dp}{p} > 0 \quad (19)$$

which apply to the source fluid in the heat exchanger 12 in FIG. 9 and also to the working fluid in the heat exchanger 14. For the fluid to be heated, i.e., $dQ>0$, and if $dA<0$ then $$\frac{dV}{V} > 0 \text{ and } \frac{dp}{p} < 0 \quad (20)$$

which apply to the working fluid in heat exchangers 12 and also to the source fluid in heat exchangers 14. It follows that by diverging the channel in the flow direction of the heating fluid and by converging the channel in the flow direction of the heated fluid, all the heating and cooling processes can be achieved isothermally.

4. ATEC Systems

In this section, three ATEC systems will be considered: (A) and (B) the source fluid in gaseous state and (C) the source fluid cooled from gas to liquid. For simplicity, but without loss of generality, the following assumptions are made for the simplifying analysis of the two systems, A and C.

(a) The source fluid in System A is an ideal gas with constant specific heat, while that in System C is nitrogen.

(b) The working fluid is the same of the source fluid, but is pressurized.

(c) All expansion and compression processes are isentropic.

(d) A temperature difference of 5.5° C. is allowed for heat transfer. All notations are the same as those defined in preceding sections and units of thermo-physical properties are the same as those for the OTEC system.

A. ATEC System without Change of Phase

The flow diagram in FIG. 4 can also be used to represent an ATEC system operating on the cycle in FIG. 9, except that the heat exchanger 12 in FIG. 4 is divided into two parts to have the source fluid cooled isothermally in one part and isobarically in the other part. The temperature-entropy diagram of the flow path aABC-DEF of the source fluid is also shown in FIG. 9. The following data are prescribed:

| | | |
|---|---|---|
| $P_a = 101.3$, | $T_a = 298.2$, | $P_A = 1.2\ P_a = 121.6$, |
| $P_C = P_B = 2.5\ P_a = 304$, | | $P_D = 1.2\ P_a = 121.6$, |
| $T_D = 90$, | | $P_E = P_F = 40$, |

With the above data, a straightforward calculation gives the net work done by the ATEC system:

$$w = 96 \text{ kJ/kg}$$

For one MW output, the flow rate of source fluid per second will be $$m = \frac{10^3}{96} = 10.4 \text{ kg/s}$$

The efficiency, defined on the basis of the heat input to the cycle, i.e. $q_{ABC}$, is $$\eta' = 34\%$$

Note that the non-cyclic system is necessary.

B. ATEC System for Power, Heating and Cooling

Figure 10:
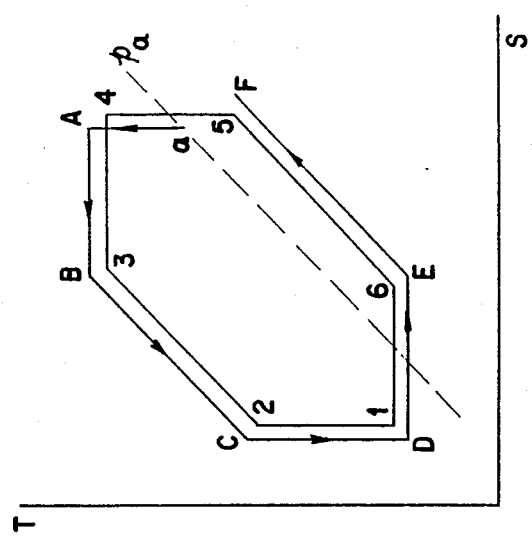
FIG. 10 is a flow diagram of an ATEC system primarily for heating and cooling.
Figure 11:
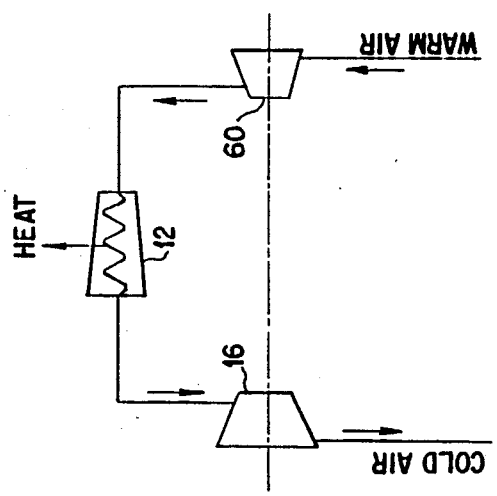
FIG. 11 shows the Temperature-Entropy diagram of the system in FIG. 10.

As a special case of the ATEC system, the heat exchange 14, the turbine 13 may be deleted and utilizing the source fluid to be the working fluid so that the system operates only noncyclically. The steady-state operation may be illustrated by the flow diagram in FIG. 10. The temperature-entropy diagram of the source fluid is shown in FIG. 11 where isobaric lines are also shown by dashed lines. Heat is dissipated to the space which is to be heated through the heat exchanger 12. Cold source fluid effluent from the turbine 16 can be used for any cooling process. Since $S_a - S_C < S_A - S_B$, entropy is continuously produced in the surroundings, an isolated system. Since $h_B - h_C \geq h_A - h_a$, useful work can be done.

C. ATEC System with Change of Phase

When the change of phase is allowed for the source fluid and so is also for the working fluid, the ATEC system may operate basically on the Rankine cycle. The flow diagram is the same as that in FIG. 7 except that the non-cyclic system is optional. In FIG. 10 are shown schematically the modified Rankine cycle 1234561, the flow-path of the source fluid aABCDE and the saturation curve of the source fluid. All heat exchangers are those discussed in the last section, so that 1-4 as well as D-E can be isothermal in the superheat region. Since the source fluid can be cooled to the cryogenic temperature, this system will be referred to as ATECC (atmosphere thermal energy conversion cryogenic) system.

As an example, the following data are provided:

| | | | |
|---|---|---|---|
| $T_a = 298.2$, | $P_a = 101.3$, | $P_A = 1.2\ P_a = 121.6$, | $P_B = 3_{pa} = 303$ |
| $h_B = 325.7$, | $T_C = 80$, | $h_C = -115.9$ | |
| $P_D = 101.3$ | $T_D = 77.3$ | $h_D = h_C = -115.9$ | |
| $X_D$(quality at D) = 0.028, | | | |

From the above data, a straightforward calculation gives the net work produced by and the efficiency of the ATECC system respectively:

$$w = 214 \text{ kJ/kg}, \Theta = 39\%$$

For one MW output, the flow rate of the source fluid is $$m = 4.6 \text{ kg/s}$$

5. A-OTEC Systems

Figure 13:
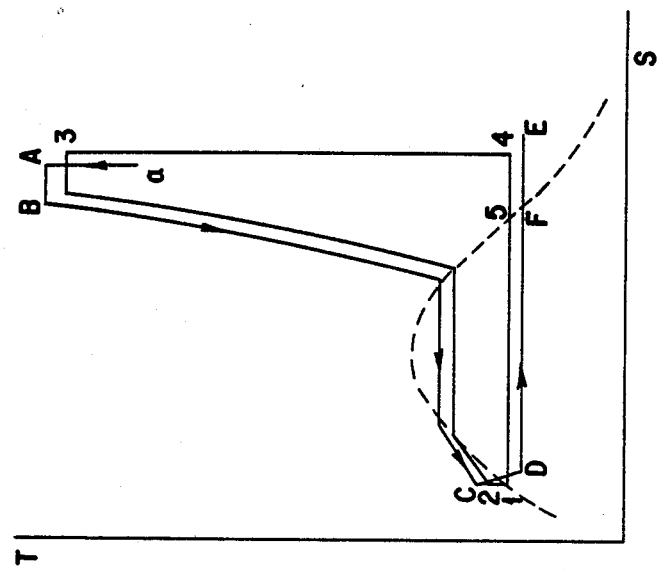
FIG. 13 is a flow diagram of an A-OTEC system.

The OTEC system discussed in Section 2 operates in a temperature range so low that its efficiency can be only a few percent. The ATEC systems requires very large heat exchangers. The larger the heat exchanger, the higher will be its cost. Since the enthalpy of water per unit volume is about one thousand times larger than that of air, and the triple point of air can be very low, it is advantageous to use water as much as possible to be the heat source while air to be the heat sink. A flow diagram of such an A-OTEC system may be illustrated in FIG. 13. The same numerals in FIGS. 7 and 13 represent similar components, except that primed numerals are for the OTEC system, while those unprimed are for the ATEC system. Heat exchangers 11's are for isothermal heating of the working fluid, whereas 12's are for isobaric heating.

Figure 14:
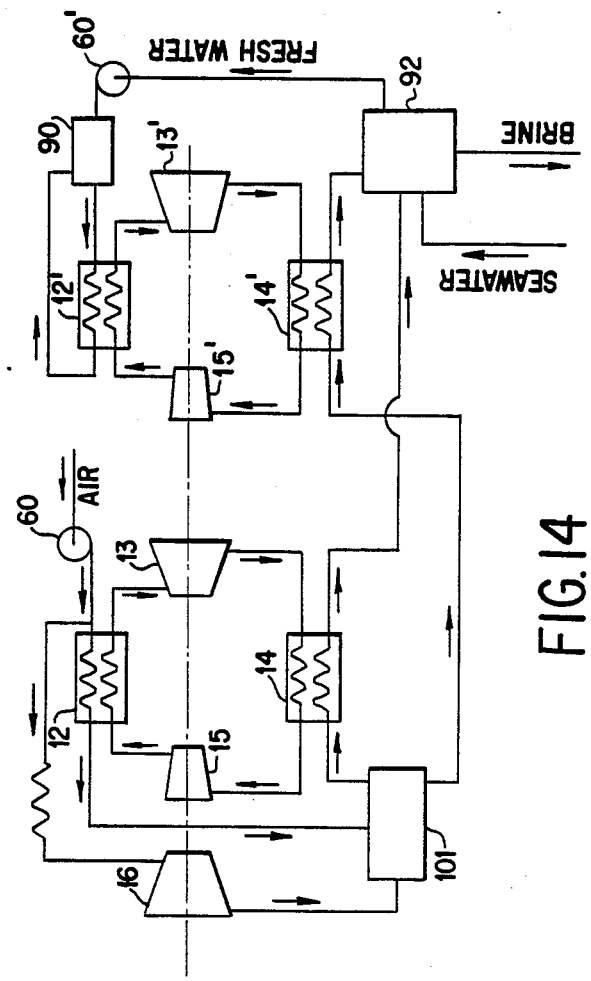
FIG. 14 shows the vortex chamber of FIG. 13.
Figure 15:
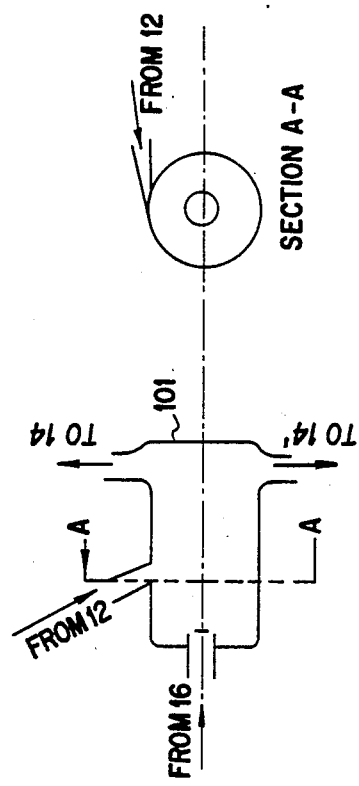

The aerial source fluid, delivered by the supercharger 60 at a flow rate double that required by the ATECC system alone, is equally divided into two streams: stream I passes through the heat exchangers 11 and 12 and is cooled to liquid saturation temperature while stream II expands in the turbine 16 to the same temperature of stream I. These two streams are then mixed in a vortex chamber 101 of which an enlarged view is shown in FIG. 14. Stream I of liquid flows into the chamber through a nozzle to become a vapor jet tangential to the chamber wall to flow a spiral vortex. Stream II of gas effluent from the turbine 16 is inducted into the vortex core, mixing with stream I and resulting at a pressure greater than the ambient pressure. This further cooled aerial source fluid is then divided into two equal parts: one part is used to cool the expanded working fluid of the ATEC system and the other part does the same for the OTEC system.

The aerial source fluid effluent from heat exchangers 14 and 14' can be used for desalination of seawater. The fresh water thus produced is warmed in a reservoir 90 and then is used as the heat source of the OTEC system, if no other fresh water is available.

As an example, the given data of the ATECC system discussed in the preceding section may be used. If the OTEC system also operates on the modified Rankine cycle, then a straightforward calculation gives $$w = \text{total work done by the A-OTEC system} = 660 \text{ kJ/kg}$$

$$\eta' = 61\%$$

For this case, the turbine 16 contributes almost one third of the total work done. The heat exchanger 11' and 12' can be one thousand times smaller. Obviously, an A-OTEC system can also be made up by integrating an ATEC and an OTEC systems, independent of each other and operating on a gas or a vapor cycle.

From the above discussions, the following conclusions can be drawn.

1. The second law statement that entropy cannot decrease continuously in an isolated system holds true for a closed as well as an open system.

2. The Kelvin-Planck statement of second law (or its equivalent versions) holds also for closed and open systems, since for either system to produce work there must be more than one reservoirs, although the statement was obviously based upon a closed system in view of the phrase "operating in a cycle".

3. The thermal energy of environmental fluids at the ambient temperature (say 25° C.) is not at "dead state". If an energy system operates with a heat sink to be in fluid state, then the triple point of the sink fluid may be considered to be the dead state.

4. The efficiency of ATEC and A-OTEC systems can be as large as that of conventional power plants, even though the temperature difference between the heat source and sink may be smaller.

5. An ATEC system or an A-OTEC system can be installed in the proximity of an existing power plant in order to increase substantially the original output and reduce chemical pollution of environment.

6. Waste water from cities and industries can also be used as a heat source, or a supplementary heat source, and can be purified as usable water by a freezing process. The remains can then be treated with much less cost than the present method of sewage treatment.

7. The electricity produced by an A-OTEC system may cost less than five cents per kW-hour. This cost can be further reduced when by-products of refrigeration are taken into account, such as desalination of seawater, cooling of superconductors, gas liquefaction, etc.

8. The ATEC and A-OTEC systems can be applied to transportation means, such as land moving vehicles and ocean-going vessels and even commercial airplanes, if a limited amount of fuel is supplemented as an additional heat source.

9. These energy systems are free from pollution. The only undesirable environmental effect is the continuous production of cold fluids to the environment. Therefore, large scale use of these power plants will affect the climate. In spite of the long range effect to the climate, the large scale use of these energy systems will relieve the dependence on fossil and fission nuclear fuels at the least cost and at the shortest time.

What is claimed is:

1. A method of utilizing environmental fluids as heat sources for energy conversion systems, each including: a first heat exchange means operatively associated with a heat source; a prime mover operating on a closed cycle and operatively associated with the first heat exchange means; a further cooling system operatively associated also with the first heat exchange means; a second heat exchange means operatively associated with the prime mover and the further cooling system; and an auxiliary system for starting the operation of the energy conversion system; said method comprising steps of:
    (a) utilizing the aforesaid heat sources as open reservoirs;
    (b) admitting a source fluid to the first heat exchange means;
    (c) applying a coolant provided by the auxiliary starting system to the second heat exchange means for initiating the release of thermal energy from the source fluid and for starting the operation of the energy conversion system;
    (d) disconnecting the auxiliary starting system for the steady state operation;
    (e) continuing to pass the source fluid through the first heat exchange means wherein the working fluid of the prime mover is heated and the source fluid is cooled thereby;
    (f) allowing the heated working fluid to expand in the prime mover to do work;
    (g) conducting a cooled source fluid effluent from the first heat exchange means into a further cooling system to become further cooled;
    (h) utilizing the further cooled source fluid to cool the expanded working fluid of the prime mover through the second heat exchange means;
    (i) utilizing the source fluid effluent from the energy conversion system for other cooling and refrigeration processes, and
    (j) integrating more than one of such energy conversion systems into one unit to increase the output and to reduce the capitol investment.

2. The method of claim 1 wherein other refrigeration process includes a freezing process for liquid purification.

3. The method of claim 2 wherein the liquid purification process includes the desalination of seawater.

4. The method of claim 1 wherein the other cooling process includes the liquefaction of gases.

5. The method of claim 1 wherein other cooling process includes the cooling of superconductors.

6. The method of claim 1 wherein the source fluid is seawater (OTEC) the prime mover includes a vapor turbine and a condensate pump operating on the basis of the Rankine cycle; the first heat exchange means includes at least two heat exchangers, one for isothermal and the other for isobaric heat exchange between the source and working fluid; the second heat exchange means includes at least one heat exchanger for isothermal heat exchange between the further cooled source fluid and the expanded working fluid; and the further cooling system includes a throttling valve and a jet pump.

7. The method of claim 1 wherein the source fluid is atmosphere (ATEC); the prime mover includes a gas turbine and a compressor operating on a closed cycle; the first heat exchange means includes at least one heat exchanger; the second heat exchange means includes also at least one heat exchanger; the further cooling system includes at least one turbine in which the cooled source fluid expands to do work and becomes further cooled at the exit of the turbine, the further cooled source fluid being used to remove the exhaust heat from the prime mover.

8. The method of claim 7 wherein the closed cycle includes adiabatic compression and expansion and isothermal or nearly isothermal heating and cooling processes.

9. The method of claim 7 wherein the closed cycle includes adiabatic compression and expansion, isothermal and isobaric heating, and isothermal and isobaric cooling processes.

10. The method of claim 7 wherein the closed cycle includes adiabatic compression and expansion, decreasing-pressure heating and increasing pressure cooling in the direction of flow of the working fluid.

11. The method of claim 7 wherein the turbine of the prime mover and the second heat exchange means are deleted so that the ATEC system operates only noncyclically.

12. The method of claim 1 wherein the source fluid is the atmosphere allowed to be liquefied (ATECC); the prime mover includes a vapor turbine and a condensate pump operating on the basis of the Rankine cycle; the first heat exchange means includes at least one heat exchanger; the second heat exchange system includes at least one heat exchanger; and the further cooling system includes an expansion valve.

13. The method of claim 1 wherein more than one environmental fluids are utilized simultaneously as heat sources (A-OTEC) with water to be used as much as possible to be the heat source while atmosphere to be used as the heat sink; each prime mover may operate on a gas or a vapor cycle; each first heat exchange means includes more than one heat exchangers for isothermal and isobaric heat exchanges between the source and working fluids; each second heat exchange means includes also at least one heat exchanger for the same purpose; the further cooling system includes a turbine with the aerial source fluid to be the working fluid, and an expansion device and a vortex chamber serving for both the ATEC and the OTEC systems.

* * * * *